April 1, 1930.    F. W. GAY    1,752,666

PROTECTIVE SYSTEM FOR TRANSMISSION CIRCUITS

Filed Sept. 19, 1928    2 Sheets-Sheet 1

INVENTOR.
FRAZER W. GAY
BY George D. Richards
ATTORNEY

INVENTOR.
FRAZER W. GAY
BY George D. Richards
ATTORNEY

Patented Apr. 1, 1930

1,752,666

UNITED STATES PATENT OFFICE

FRAZER W. GAY, OF NEWARK, NEW JERSEY

PROTECTIVE SYSTEM FOR TRANSMISSION CIRCUITS

Application filed September 19, 1928. Serial No. 306,893.

This invention relates, generally, to means for protecting electric power generating and transmission systems from injurious short circuiting currents; and the invention has reference, more particularly, to a novel arrangement and construction of a protective system adapted to be applied to power transmission transformers for the purpose of limiting short circuit currents in grounded line conductors and for enabling such transformers to readily carry transmission loads without interference to service even though a line conductor is grounded.

It is well known that in the past it has been the general practice to solidly ground the neutral of all high voltage transmission circuits. This grounding is accomplished by solidly grounding the neutral connections of the high voltage transformer banks used in such circuits. By so grounding the neutrals of the transformer banks, the cost of such transformers is lessened, since graded insulation may be used, i. e. the insulation to ground on those parts of the windings adjacent to the neutral connection may be of a relatively cheap character. This grounding of the neutral results in a high current flow on any phase conductor that becomes grounded. Such high current flow is utilized to operate suitable relay devices to thereby cut the grounded phase conductor out of circuit. However, the system disturbance resulting from the high currents incident to a grounded phase conductor frequently results in the falling out of step of synchronous equipment and in serious interference to service. To overcome this objection of excessive currents on grounded phase leads, attempts have been made in some recent installations to use a resistance in the transformer neutral ground connection to thereby limit the single phase short circuit current that will flow when a phase conductor breaks down to ground.

This arrangement has disadvantages in that those parts of the transformer adjacent to the neutral connection must be insulated to ground for a very high voltage thereby losing the advantages of "graded insulation".

Also the high resistance required between the neutral and ground necessitates a comparatively great length of resistor unit and consequently one of comparatively high cost. Also such resistance is bulky and difficult to insulate. Furthermore, in old systems where graded insulation is extensively used and where the neutral must be kept solidly grounded, it is not possible to use a neutral resistance.

It is the object of this invention to provide a novel construction and arrangement of protective system which permits the neutral to be solidly grounded thereby utilizing the advantages of graded insulation, and at the same time effecting limitation of the current that may flow into a fault on a line conductor to a safe value.

Other objects and advantages of this invention, not at this time more particularly enumerated, will be clearly understood from the following description of the same.

With the various objects of this invention in view, the same consists, primarily, in the novel construction and arrangement of protective system hereinafter set forth; and, the invention consists, furthermore, in the novel arrangements and combinations of the various devices and parts, as well as in the details of construction of the same, all of which will be hereinafter more fully described and then finally embodied in the claims appended hereto.

The invention is clearly illustrated in the accompanying drawings, in which:—

Similar characters of reference are employed in all of the hereinabove described views to indicate corresponding parts.

Figure 1:
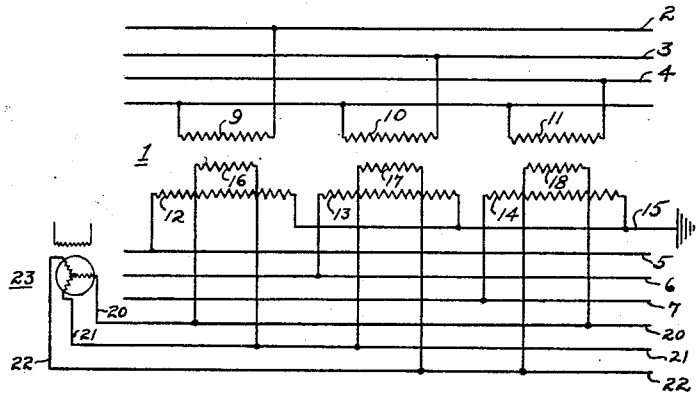
Figure 1 is a schematic circuit diagram illustrating a typical three phase transformer having tertiary windings connected to a synchronous condenser.

Referring now to the said drawings, Figure 1 illustrates a typical three phase transformer bank connected in a power circuit in a manner common in the arm. In this figure, the reference numeral 1 designates a transformer bank composed of three single phase transformers that are adapted to transmit electrical energy from a generator or other circuit having conductors 2, 3 and 4 to a load circuit having conductors 5, 6 and 7. The primary windings 9, 10 and 11 of the transformer bank 1 are illustrated as star connected. The secondary windings 12, 13 and 14 are also star connected and the neutral point of these windings is connected by a lead 15 to ground. Transformer bank 1 is provided with tertiary windings 16, 17 and 18 adapted to be optionally connected in delta or star. Tertiary windings 16, 17 and 18 are illustrated as connected by leads 20, 21 and 22 to a synchronous condenser or dynamo 23. Synchronous condenser 23 operates in a manner well known in the art to maintain a constant terminal voltage as for instance on the lines 5, 6 and 7 regardless of normal load variations on this line. In the event that one of the conductors 5, 6 and 7 of the load circuit becomes grounded, the corresponding secondary winding 12, 13 or 14 connected to the grounded conductor becomes short circuited, thereby causing a relatively large flow of short circuit current in such winding. Also, the tertiary winding 16, 17 or 18 inductively associated with the short circuited secondary winding becomes short circuited causing short circuiting currents to flow in the synchronous condenser 23. This short circuiting of these several windings results in the disruption of the service supplied by the load circuit 5, 6 and 7 and circuit 2, 3 and 4, which disrupted service continues until the ground in the load circuit is eliminated. Also such short circuiting of a secondary winding may result in serious injury to the system.

Figures 2, 3:
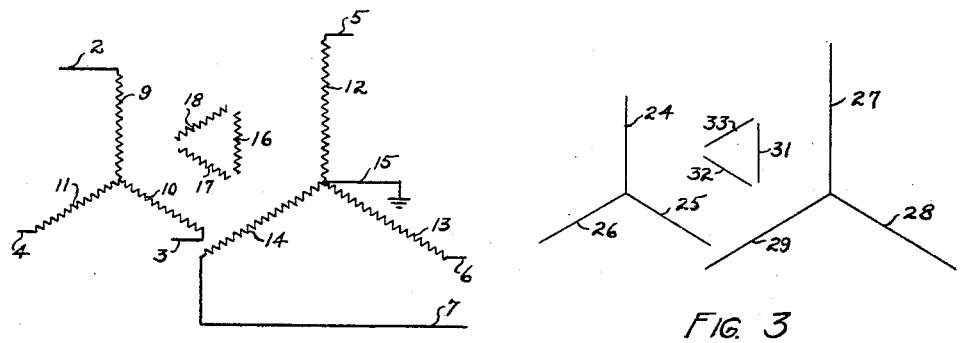
Figure 2 is a diagrammatic representation of a portion of the arrangement illustrated in Figure 1, the tertiary windings being shown as open circuited.
Figure 3 is a voltage vector diagram of the arrangement illustrated in Figure 2.

In Figure 2 is illustrated a hypothetical arrangement wherein the transformer connections of Figure 1 are modified to illustrate the principles of the present invention. In this figure the several windings of the transformer bank 1 are arranged vectorially and the tertiary windings 16, 17 and 18 are shown as open circuited for purposes of illustration. Figure 3 is the voltage vector diagram of the component parts of the transformer bank shown in Figure 2 when this bank is operating under normal conditions. Vectors 24, 25 and 26 designate the voltages of windings 9, 10 and 11 respectively and are of equal magnitudes. Vectors 27, 28 and 29 designate the voltages of windings 12, 13 and 14 respectively and also are of equal magnitude. Voltages produced in the tertiary windings 16, 17 and 18 are indicated at 31, 32 and 33 respectively and are of like magnitudes.

Figure 4:
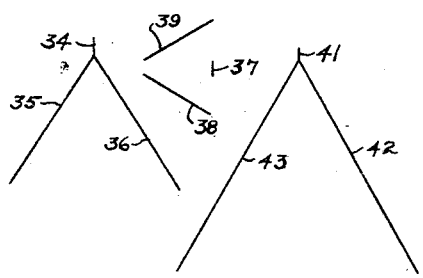
Figure 4 is a voltage vector diagram of the arrangement illustrated in Figure 2 with a phase line grounded.

In the event that one of the load circuit conductors 5, 6 and 7 of Figure 2 becomes grounded, the voltage of the secondary winding connected to such grounded conductor falls to a low value which causes a corresponding drop in the other windings. For example, should the conductor 5 become grounded the voltage vector 24 of Figure 3 drops to the value indicated at 34 in Figure 4. The voltage of the remaining primary windings 10 and 11 increases correspondingly to take up that which was lost in winding 9. This is illustrated in Figure 4 by the vectors 35 and 36. The voltages obtaining in the tertiary windings 16, 17 and 18 are similarly affected. The voltage of winding 16 drops from the magnitude indicated at 31 in Figure 3 to that indicated at 37 in Figure 4 whereas the voltages of windings 17 and 18 increase to the values indicated by the vectors 38 and 39. The voltages of the secondary windings are indicated at 41, 42 and 43 in Figure 4. The voltage value 41 will be relatively low and may approach zero and the corresponding primary voltage 34 is equal to the impedance drop in the short circuited winding 9 which drop is produced by the hight magnetizing current supplied through winding 9 to windings 10 and 11. This magnetizing current results in a small current in the short circuited high voltage winding 12.

While operating under such short circuit conditions, the load that was originally carried by the three primary and the three secondary windings of the transformer bank 1 is now largely carried by but two primary windings 10 and 11 and two secondary windings 13 and 14. This increased load and corresponding voltage is not so great but that they may readily be carried by these windings inasmuch as the insulation between turns and layers of the transformer bank is more than ample to take care of such increased load and corresponding voltage.

Figure 5:
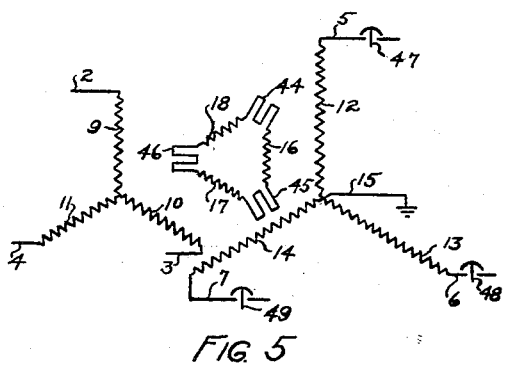
Figure 5 is a diagrammatic view of one form of the novel protective system of this invention;

Figure 5 illustrates a practical adaptation of the hypothetical arrangement illustrated in Figure 2 and constitutes a showing of one form of the novel system embodying the protective features in accordance with the principles of the present invention. This form of the novel system has the same connections as shown in Figure 2 with the exception that the delta circuit of the tertiary windings is closed by impedances 44, 45 and 46. These impedances serve to allow a limited current to flow through a grounded power line conductor, so as to effect the operation of the corresponding circuit breaker 47, 48 or 49 inserted in these conductors, thereby opening the circuit of such grounded conductor. Should the conductor 5 of Figure 5 become grounded for example, the circuit breaker 47 will immediately open and the remaining conductors 6 and 7 will supply the load in the manner described in connection with Figures 2 to 4. The voltage vectors of the primary, secondary and tertiary windings under such conditions closely approximate those for the open delta connection illustrated in Figure 4.

It is evident that a short circuit across the winding 12 will greatly reduce the voltage of windings 12, 16 and 9 and produce a corresponding increase in voltage across the windings 14, 18 and 11 and 13, 17 and 10. Since the voltage of winding 16 is reduced and the vector sum of the voltages of windings 17 and 18 is increased, these windings will endeavor to feed energy to the winding 16, but the feeding of such energy will be greatly limited by the impedances 44, 45 and 46 combined with that of the windings 16, 17 and 18. It will be evident that the current in winding 12 may be held to any desired value by varying the magnitude of the impedances 44, 45 and 46. Where such impedances are not used, as in Figure 1, an enormous current will flow into the tertiary windings which current is limited only by the impedances inherent in the windings themselves and their connected circuits. This would result in a serious drop in voltage on the entire system which might allow synchronous machinery to fall out of step and even shut down such system.

Figure 6:
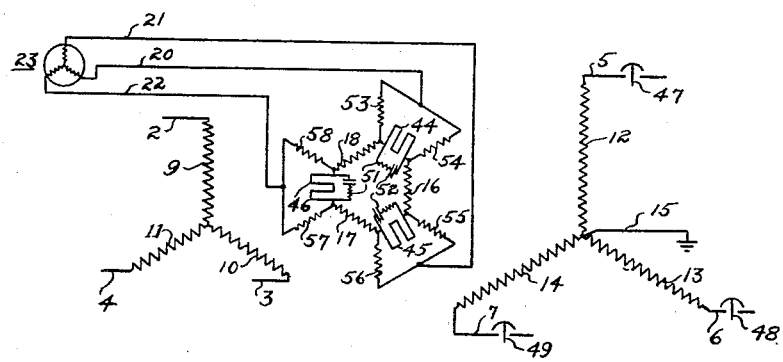
Figure 6 is a diagrammatic view of another form of the invention.

According to the arrangement of the invention illustrated in Figure 6, the impedances closing the delta wound tertiary circuit are by-passed by suitable resonant shunts. In this figure, parts corresponding to similar parts of Figure 5 are indicated by corresponding reference numerals. The resonant shunts each comprise an inductance 51 and a capacitance 52. These resonant shunts are tuned for 180 cycles and act to carry the triple harmonic current generated in the tertiary windings 16, 17 and 18 past the impedances 44, 45 and 46 thereby reducing resistance losses and acting to hold down the maximum value of the voltage in the transformer which would tend to rise as a result of the star-star transformer connection.

Figure 7:
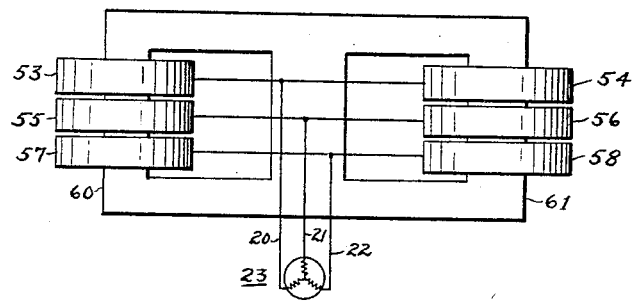
Figure 7 is an enlarged detail view of a portion of the structure of Figure 6.

The leads 20, 21 and 22 of the synchronous condenser or dynamo 23 are connected to the delta connected tertiary windings 16, 17 and 18 through current limiting impedances 53, 54, 55, 56 and 57, 58 arranged in parallel pairs. These impedances are arranged so as to allow the synchronous condenser 23 to supply current to the tertiary windings with very little impedance but effectively prevent the by-passing of load current around the impedances 44, 45 and 46. Impedances 53, 54, 55, 56 and 57, 58 may be arranged as illustrated in Figure 7. In this figure impedances 53, 55, 57 are illustrated as coils mounted on a common core 60. Since these impedances normally carry a balanced three phase current, their total M. M. F. will be substantially zero resulting in a zero flux in the core 60. The voltage across impedances 53, 55 and 57 will therefore normally be very low. Impedances 54, 56 and 58 are also illustrated as coils mounted on a common core 61. Since these impedances also normally carry a balanced three phase current, their total M. M. F. will be zero resulting in a substantially zero flux in the core 61 and a low potential drop across these impedances. In other words, the impedance offered by coils 53 to 58 to the flow of the normal synchronous condenser current is very low. On the other hand, should a single phase current, such as would result from a grounded load circuit conductor, endeavor to flow around the delta connected tertiary, such current will be unable to flow through coils 53 to 58 owing to the high impedance of these coils to a single phase current. Such single phase current is compelled therefore to flow through the impedances 44, 45 and 46 which severely limit such current. This action of the impedances 44, 45 and 46 reduces the current induced in the grounded secondary winding to a low value thereby preventing the flow of a destructive current to the grounded conductor connected to such secondary winding. The impedances 44, 45 and 46 not only greatly limit the current that may be taken by the grounded secondary from its corresponding primary winding but they also limit the current that would tend to pass to said secondary winding from the synchronous condenser 23.

Figure 8:
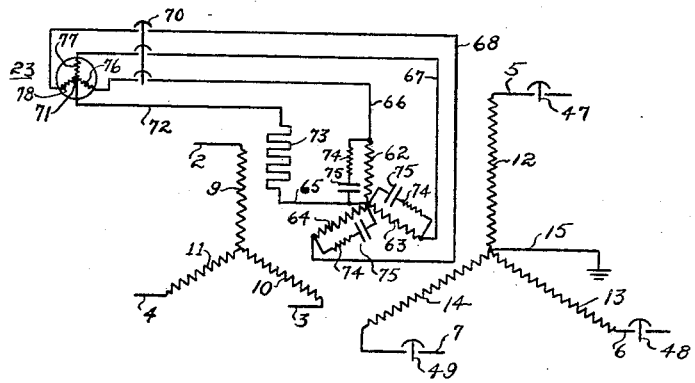
Figure 8 is a diagrammatic view of the preferred form of the invention.

The preferable form of the invention is illustrated in Figure 8 wherein the tertiary windings 62, 63 and 64 are illustrated as star connected. The neutral point of these windings is connected to a neutral transformer bus 65. The other ends of these windings are connected by leads 66, 67 and 68 to the synchronous condenser or dynamo 23 having windings 76, 77 and 78. The neutral point 71 of the synchronous condenser 23 is connected to a neutral condenser bus 72. Neutral condenser bus 72 is connected through an impedance 73 to the neutral transformer bus 65. A circuit breaker 70 is shown for effecting the opening or closing of the circuits extending through the leads 66, 67 and 68. Resonant shunts are illustrated as connected across each of the tertiary windings 62, 63 and 64 to allow a free passage of triple harmonic currents. In the event that such resonant shunts are not employed the triple harmonic currents would pile up dangerous voltages at the neutral point of the tertiary windings should either the circuit 1 through impedance 73 be opened or the circuit breaker 70 be opened. Thus when synchronous condenser 23 is not operating the circuit breaker 70 is open and the resonant shunts are necessary for by-passing such triple harmonic currents. Each of these resonant shunts comprise an inductance 74 and a capacitance 75 connected in series.

In operation, should a load circuit conductor become grounded, the impedance 73 acts in a manner similar to impedances 44, 45 and 46 of Figure 6 to limit the short circuit current flowing to such grounded conductor. For example, should line conductor 5 of Figure 8 become grounded the secondary winding 12 is short circuited since both of its ends are then grounded. A single phase current will tend to flow in this winding which necessitates a corresponding current flow in tertiary winding 62 through bus 65, impedance 73, bus 72 and winding 76 of the synchronous condenser 23. Impedance 73 acts to severely limit this current flow, thereby enabling secondary windings 13 and 14 to carry the system load.

This preferred form of the invention is particularly advantageous when a plurality of transformer banks are employed. In such case the neutral of the tertiary winding of each transformer will be connected to a common neutral transformer bus 65 and the other terminals of each tertiary winding will be connected to a synchronous condenser 23. Each synchronous condenser 23 will have its neutral connected to the common neutral condenser bus 72. Such an arrangement enables a single impedance 73 to limit short circuiting currents in all of the windings of a plurality of transformers. This arrangement is preferable to the arrangement illustrated in Figure 6 wherein each transformer bank is equipped with three impedances 44, 45 and 46. Should six transformer banks be employed then eighteen such impedances would be necessary in using the delta connected tertiary of Figure 6, whereas but a single impedance 73 would be necessary for transformers employing the arrangement of Figure 8.

Also in employing this arrangement illustrated in Figure 8, should a line conductor become grounded, the impedance 73 will allow current to pass over the short circuit conductor only sufficient in magnitude to operate a circiut breaker to open the circuit through the same, whereas with the arrangement illustrated in Figure 6 the current flowing into the grounded conductor will be as many times that necessary to operate the circuit breaker as there are transformer banks, provided current flowing through a single bank is sufficient to produce such an operation.

It will be obvious that if desired the primary winding of the transformer banks may be eliminated and a power generator or dynamo substituted for the synchronous condenser 23, in which event the protective system would function to limit single phase currents as before.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an electric power distribution system, a three phase dynamo, a circuit for said dynamo, a three phase transformer, said transformer having a three phase star connected low voltage winding connected in said dynamo circuit and a three phase high voltage winding with a grounded neutral, and conducting means connnected to the neutral of said transformer low voltage winding causing the free flow of triple harmonic current from said neutral.

2. In an electric power distribution system, a three phase transformer bank having a star connected primary winding and a star connected secondary winding, said secondary winding having its neutral solidly grounded, a three phase generator arranged to feed its generated energy to the primary winding of said transformer bank, a generator neutral bus and a transformer neutral bus, said generator having its neutral connected to said generator neutral bus, and said transformer primary winding having its neutral connected to said transformer neutral bus, and impedance means connecting said generator neutral bus and said transformer neutral bus and acting to limit single phase currents flowing in said transformer secondary winding.

3. In an electric power distribution system, a three phase transformer bank having a star connected primary winding and a star connected secondary winding, said secondary winding having its neutral solidly grounded, a three phase generator arranged to feed its generated energy to the primary winding of said transformer bank, a generator neutral bus and a transformer neutral bus, said generator having its neutral connected to said generator neutral bus, and said transformer primary winding having its neutral connected to said transformer neutral bus, impedance means connecting said generator neutral bus and said transformer neutral bus and acting to limit single phase currents flowing in said transformer secondary winding and means connected to the neutral of said transformer primary winding and adapted to freely pass triple harmonic currents from said primay neutral.

4. In an electric power distribution system, a dynamo electric machine and a three phase power transformer bank comprising, a star connected low voltage primary winding adapted to receive electric energy, a high voltage star connected secondary winding having its neutral grounded and adapted to feed energy, and a star connected tertiary winding having its terminals connected to the terminals of said dynamo electric machine.

5. In an electric power distribution system, a three phase transformer having a plurality of star connected windings, one of said windings having its neutral solidly grounded, a dynamo, a circuit for said dynamo, said dynamo circuit including another of said transformer windings, and impedance means in said dynamo circuit, said impedance means offering a substantially negligible impedance to three phase current flowing in said winding having its neutral grounded but acting to limit the single phase current induced in said latter winding and flowing to ground.

6. In an electric power distribution system, a dynamo electric machine, an impedance and a three phase power transformer bank comprising, a star connected low voltage primary winding adapted to receive electric energy, a high voltage star connected secondary winding having its neutral grounded and adapted to feed energy, and a star connected tertiary winding having its terminals connected to the terminals of said dynamo electric machine, said dynamo electric machine having its neutral connected through said impedance to the neutral of said tertiary winding, said impedance acting to limit single phase currents flowing in said secondary winding.

7. In an electric power distribution system, a dynamo electric machine, an impedance and a three phase power transformer bank comprising, a star connected low voltage primary winding adapted to receive electric energy, a high voltage star connected secondary winding having its neutral grounded and adapted to feed energy, a star connected tertiary winding having its terminals connected to the terminals of said dynamo electric machine, said dynamo electric machine having its neutral connected through said impedance to the neutral of said tertiary winding, said impedance acting to limit single phase currents flowing in said secondary winding and shunt circuits connected across each phase of said tertiary winding for passing triple harmonic currents from the neutral of said tertiary winding.

8. In an electric power distribution system, a dynamo electric machine, an impedance and a three phase power transformer bank comprising, a star connected low voltage primary winding adapted to receive electric energy, a high voltage star connected secondary winding having its neutral grounded and adapted to feed energy, a star connected tertiary winding having its terminals connected to the terminals of said dynamo electric machine, said dynamo electric machine having its neutral connected through said impedance to the neutral of said tertiary winding, said impedance acting to limit single phase currents flowing in said secondary winding and providing a substantially resonant passage for triple harmonic currents from the neutral of said tertiary windings.

9. In an electric power distribution system, a three phase dynamo, a circuit for said dynamo, a three phase transformer, said transformer having a three phase star connected low voltage winding connected in said dynamo circuit and a three phase high voltage winding with a grounded neutral, and conducting means in shunt across each phase winding of said low voltage transformer winding, said conducting means serving to freely pass triple harmonic current.

In testimony that I claim the invention set forth above I have hereunto set my hand this 17th day of September, 1928.

FRAZER W. GAY.